Sept. 25, 1956  A. H. BLOCK  2,763,986
EMERGENCY CONTROL SYSTEM, REGULATOR AND COMPUTER MECHANISM
Filed Oct. 27, 1950. 6 Sheets—Sheet 2

$W_f$ = FUEL FLOW IN LBS./HR.
$P$ = RAM PRESSURE
$T$ = TOTAL INLET AIR TEMP.
$\Delta T$ = TURBINE GAS TEMP. MINUS TOTAL INLET AIR TEMPERATURE INVENTOR.
ARNOLD H. BLOCK
BY
*Herbert L. Davis Jr*
ATTORNEY

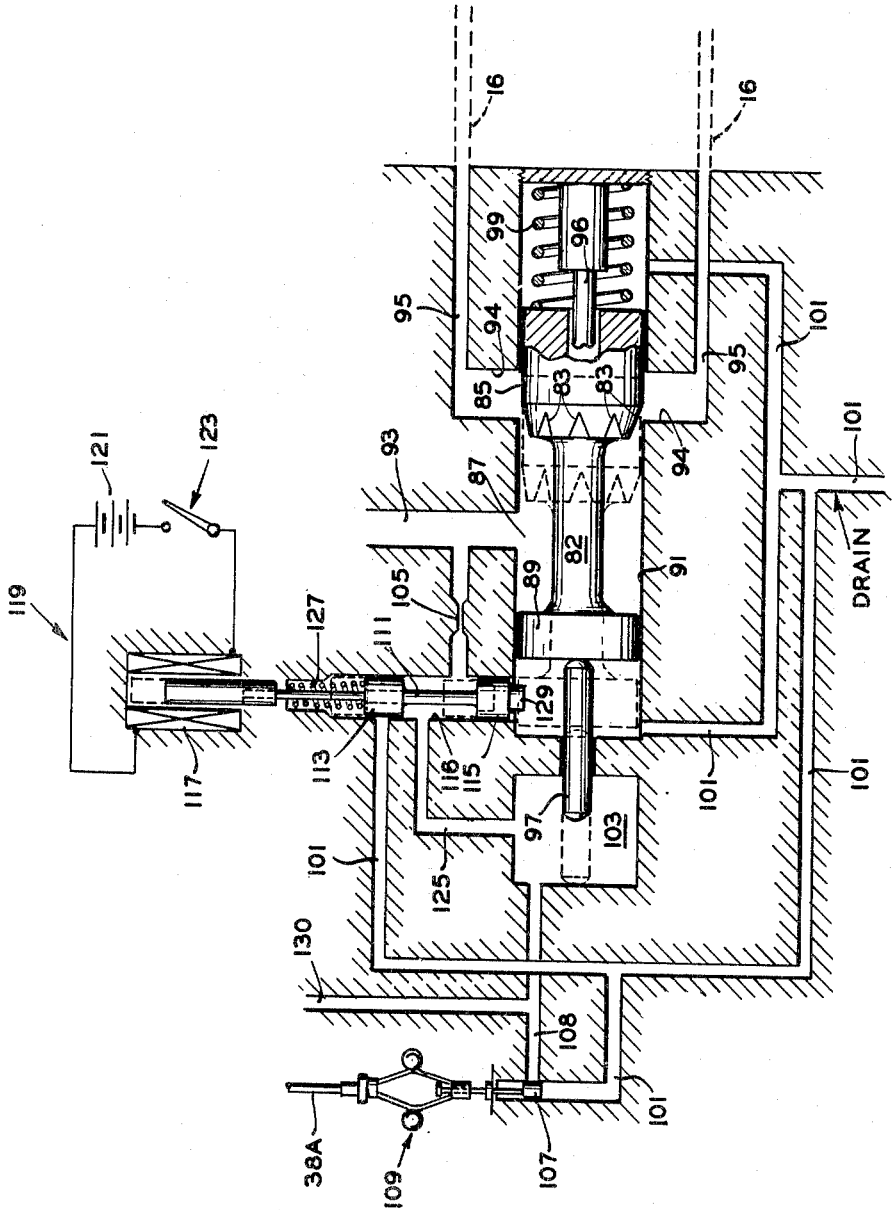

Sept. 25, 1956  A. H. BLOCK  2,763,986
EMERGENCY CONTROL SYSTEM, REGULATOR AND COMPUTER MECHANISM
Filed Oct. 27, 1950  6 Sheets-Sheet 4
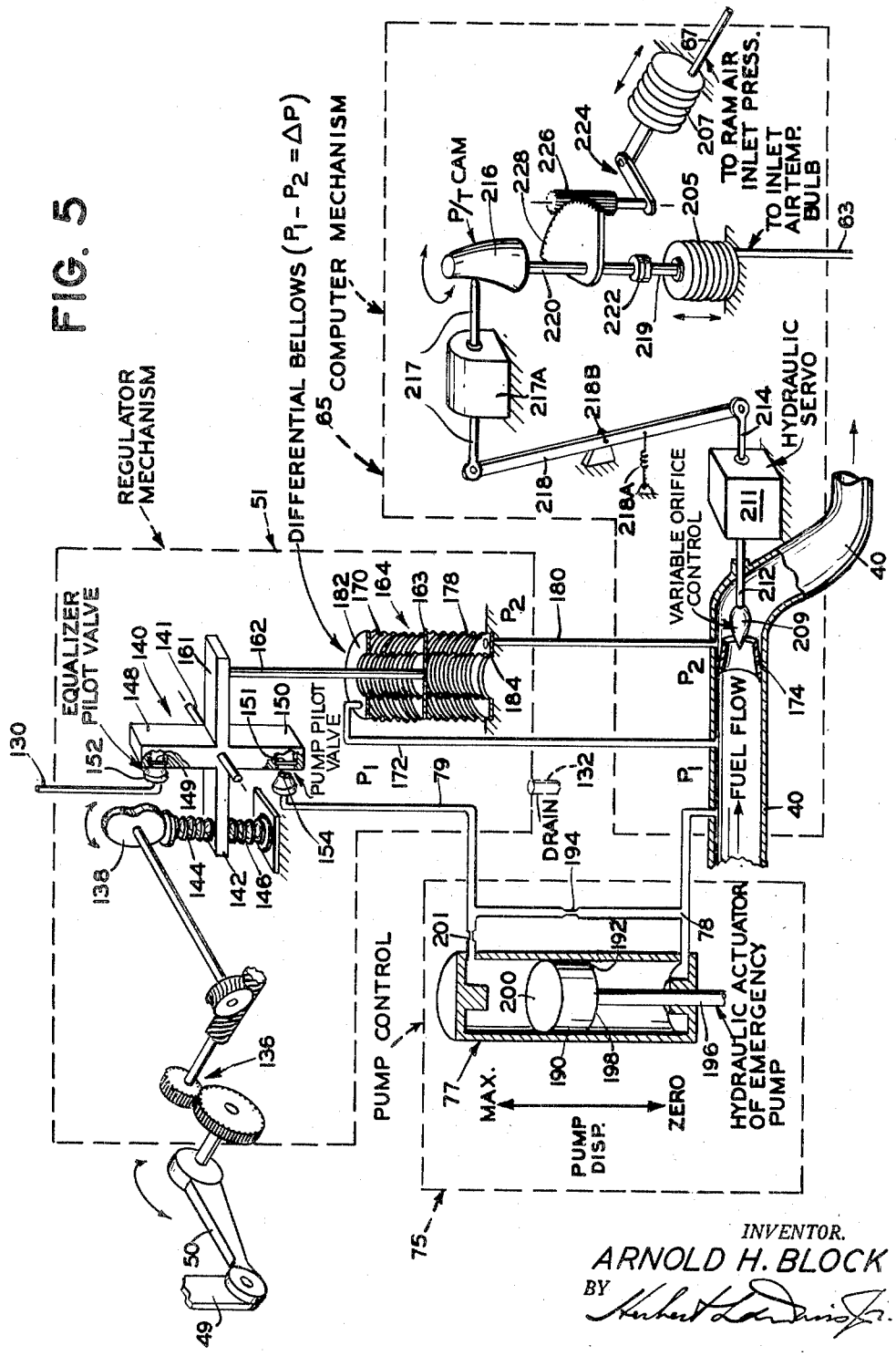
INVENTOR.
ARNOLD H. BLOCK
BY
ATTORNEY Sept. 25, 1956    A. H. BLOCK    2,763,986
EMERGENCY CONTROL SYSTEM, REGULATOR AND COMPUTER MECHANISM
Filed Oct. 27, 1950    6 Sheets-Sheet 5
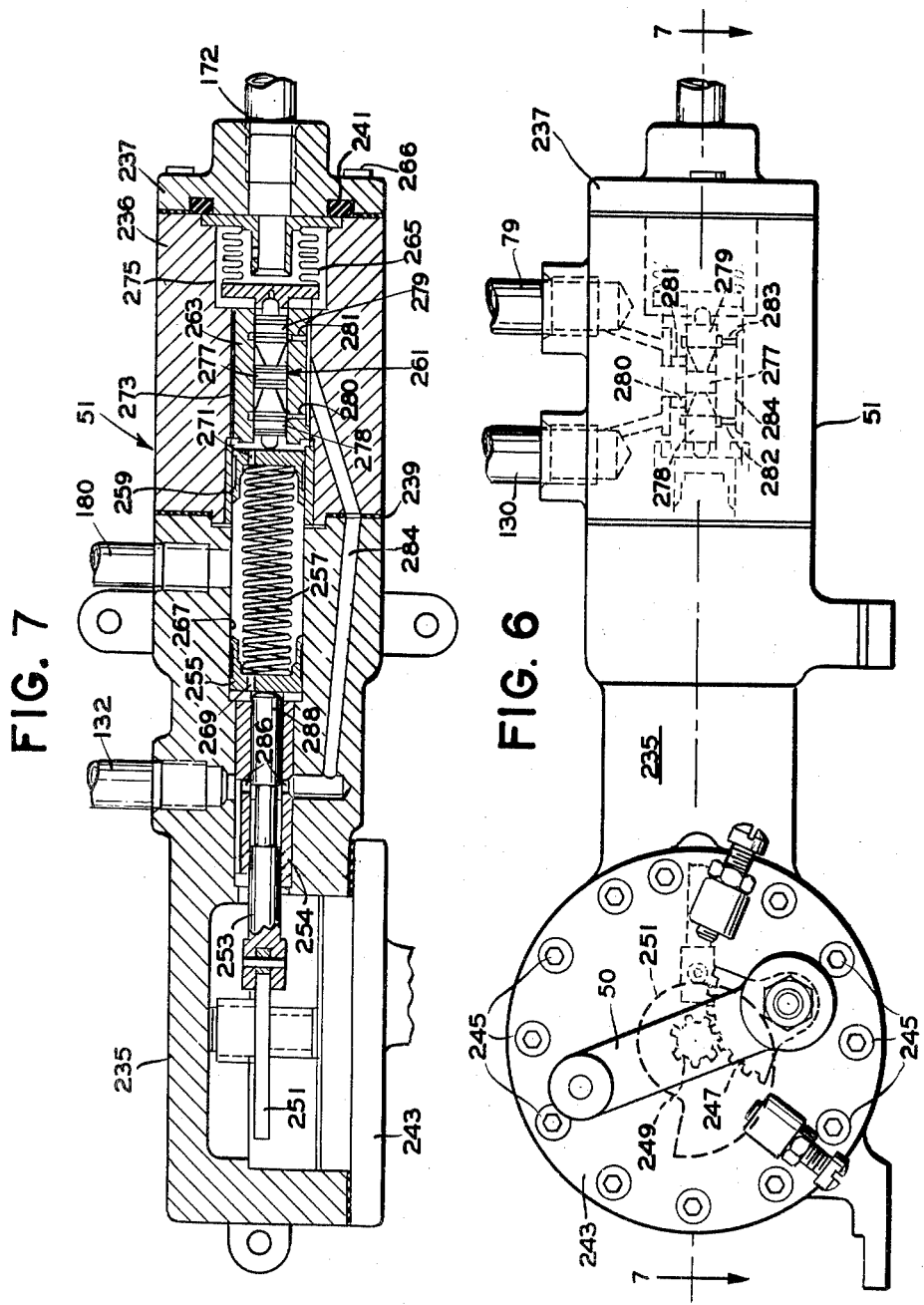
INVENTOR.
ARNOLD H. BLOCK
BY
ATTORNEY Sept. 25, 1956  A. H. BLOCK  2,763,986
EMERGENCY CONTROL SYSTEM, REGULATOR AND COMPUTER MECHANISM
Filed Oct. 27, 1950  6 Sheets-Sheet 6

FIG. 8

INVENTOR.
ARNOLD H. BLOCK
BY
*Herbert L. Davis Jr.*
ATTORNEY

United States Patent Office 2,763,986
Patented Sept. 25, 1956

2,763,986

EMERGENCY CONTROL SYSTEM, REGULATOR AND COMPUTER MECHANISM

Arnold H. Block, Hackensack, N. J., assignor to Bendix Aviation Corporation, Teterboro, N. J., a corporation of Delaware Application October 27, 1950, Serial No. 192,508

13 Claims. (Cl. 60—39.28)

The present application relates to improvements in a control system for a turbine driven aircraft engine and more particularly to an emergency control system which is completely mechanical and hydraulic, hence not subject to electrical failure and which system may serve to supply a scheduled quantity of fuel to the engine in the event of failure of a primary electronic control system.

In a copending application Serial No. 185,828, filed September 20, 1950, by Sigmund Machlanski, there is disclosed and claimed such a primary electronic control system including a pilot controlled mechanism for effecting starting, ground and flight operation of the aircraft engine. The primary control system senses engine speed, and the temperature differential between combustion temperature and air inlet temperature from which during flight operation, it computes and delivers a proper fuel supply according to the power setting represented by the position of a pilot's control lever.

The prime function of both the primary electronic control system and the emergency control system is to regulate at constant engine speed a fuel flow to the engine in such quantity as to achieve a selected power within safe limitations of the engine. In the primary electronic control, as explained in the application Serial No. 185,828, the aforenoted temperature differential and engine speed are limited by actually measuring these conditions and restricting fuel flow to the engine when the selected limits have been reached. However, under certain conditions, it is possible to be within these limits and yet exceed the maximum allowable shaft torque that may safely be applied to the engine output shaft.

In order, therefore, to limit the selected power to safe values under prevailing operating conditions, there is provided in the primary electronic system a stop computer mechanism which limits adjustment of a common pilot's control lever for both systems to within a safe range.

As disclosed and claimed in the application Serial No. 185,828 the stop computer mechanism senses ram air inlet pressure, compressor air inlet temperature and tailpipe temperature, and converts these into proper positioning of a mechanical stop which acts to limit the position of the pilot's power-selecting lever for the primary and emergency control systems.

The primary and emergency systems thus have a common source of intelligence, namely the pilot's control lever position, since both systems are operatively connected to the same pilot controlled lever mechanism, as a part of the complete control system. The emergency control is so arranged that during flight operation it will take over control of the supply of fuel to the engine upon malfunctions of the primary electronic control with no initiating action required of the pilot. This means that the emergency system must control the engine over the same parameter and to the identical state condition subject to a predetermined dead band that the control lever designates for the primary control system. Thus, malfunction of the primary control system, as indicated by failure to maintain the selected state condition, will automatically cut in the emergency control system.

In order to establish the necessary parallel action of the two separate systems, it is necessary to establish a relationship between the sensed and controlled variables of the one system with those of the other during flight operation.

As explained in the application Serial No. 185,828, during flight operation, the speed of the engine is maintained at a predetermined constant value by varying the load on the engine through operation of a variable pitch propeller mechanism. Moreover the electronic primary control, in flight operation, controls the temperature differential between compressor inlet and turbine inlet temperature, and while this temperature differential is conveniently measured by means of thermocouples for the electronic control, no direct mechanical method to sense this same variable for the emergency control is feasible.

However, a relationship does exist at constant engine speed between fuel flow to the engine, compressor air inlet temperature and pressure, and the aforenoted temperature differential which allows scheduling of these functions; this is the design basis for the emergency control which forms the subject matter of the present application.

Thus, in the event the engine should receive a fuel supply from the primary control below the scheduled amount, the emergency control would automatically bring into operation an emergency fuel pump to supply the deficiency in fuel. However, should the primary control fail in an over-supply condition, then the emergency control would bring into operation a fuel throttling valve to cause a decrease in the fuel so as to maintain the proper schedule. The inter-relation between the primary and emergency systems may be completely automatic or it may be a manual switch-over or a combination of automatic and manual.

The schedule for the emergency system is based on the steady state fuel requirements of the engine at a constant speed. However, the schedule is compensated for changes in the pressure and temperature of the inlet air to the engine.

The basis of the emergency control is graphically illustrated in Figure 2, that is, the engine characteristics are such that practically a straight line relation exists between required fuel flow in pounds per hour and the ratio $P/T$ for a given value of $\Delta T$ at a given turbine R. P. M.

A given value of $\Delta T$ may be represented by a particular value of the drop in fuel pressure ($\Delta P$) across a restricted orifice in the fuel line to the engine. In turn, these pressure drops may be directly expressed in terms of a particular control lever position, since in the subject emergency control the control lever operates on the balance of forces between $\Delta P$ and a spring load which expresses control lever position.

An object of the invention, therefore, is to provide a mechanism which senses the inlet air temperature and ram air inlet pressure to the combustion chamber of the engine and varies the datum of a fuel regulator for said engine so as to effect at constant engine speed a selected power output with changes in the inlet air temperature and ram air inlet pressure.

Another object of the invention is to provide a computer mechanism which senses the inlet air temperature and ram air inlet pressure so as to vary the datum of a fuel flow regulator for said engine to effect at constant engine speed a selected power output.

Another object of the invention is to provide a system which senses the inlet air temperature, ram air inlet pressure and fuel flow in the fuel supply line of the engine and in which the value of pressure/temperature is computed mechanically by means of a bellows and cam arrangement in which each value of pressure/temperature fixes the size of a variable orifice in the fuel supply line for said engine, and the pressure differential across said orifice is tapped off and brought out to a fuel regulator mechanism to effect a selected power output for the engine.

Another object of the invention is to provide a regulator mechanism which senses control handle position and matches its schedule value against the actual fuel flow to the engine as measured by the pressure differential across the variable orifice so as to vary an emergency pump displacement from zero to full displacement in order to supply a deficiency between actual and scheduled flow; or if required, it will operate a flow control valve mechanism so as to throttle the fuel to the scheduled flow upon an excessive fuel flow.

Another object of the invention is to provide in the regulator mechanism means actuated by control handle movement which will effectively eliminate any control by the emergency system when the control handle is brought back to some preselected position as just below engine idling position.

Another object of the invention is to provide an emergency mechanical hydraulic control which does not come into operation until such time as the fuel flow under control of the primary electrical control may exceed or drop below a predetermined dead band.

The above and other objects and features of the invention will appear more fully hereinafter from a consideration of the following description taken in connection with the accompanying drawings wherein several embodiments of the invention are illustrated by way of example.

In the drawings,

Figure 4 is a schematic diagram of a fuel throttling and flow equalizer valve mechanism for controlling the flow of fuel to the combustion chamber of the engine.

Figure 5 is a schematic diagram of the emergency control system illustrating one form of fuel regulator and computer mechanism.

Figure 6 is a side view of a second form of fuel regulator mechanism.

Figure 7 is a sectional view of the regulator mechanism of Figure 6 taken along the lines 7—7 of Figure 6.

Figure 8 is a sectional view of a second form of the computer mechanism.

Figure 1:
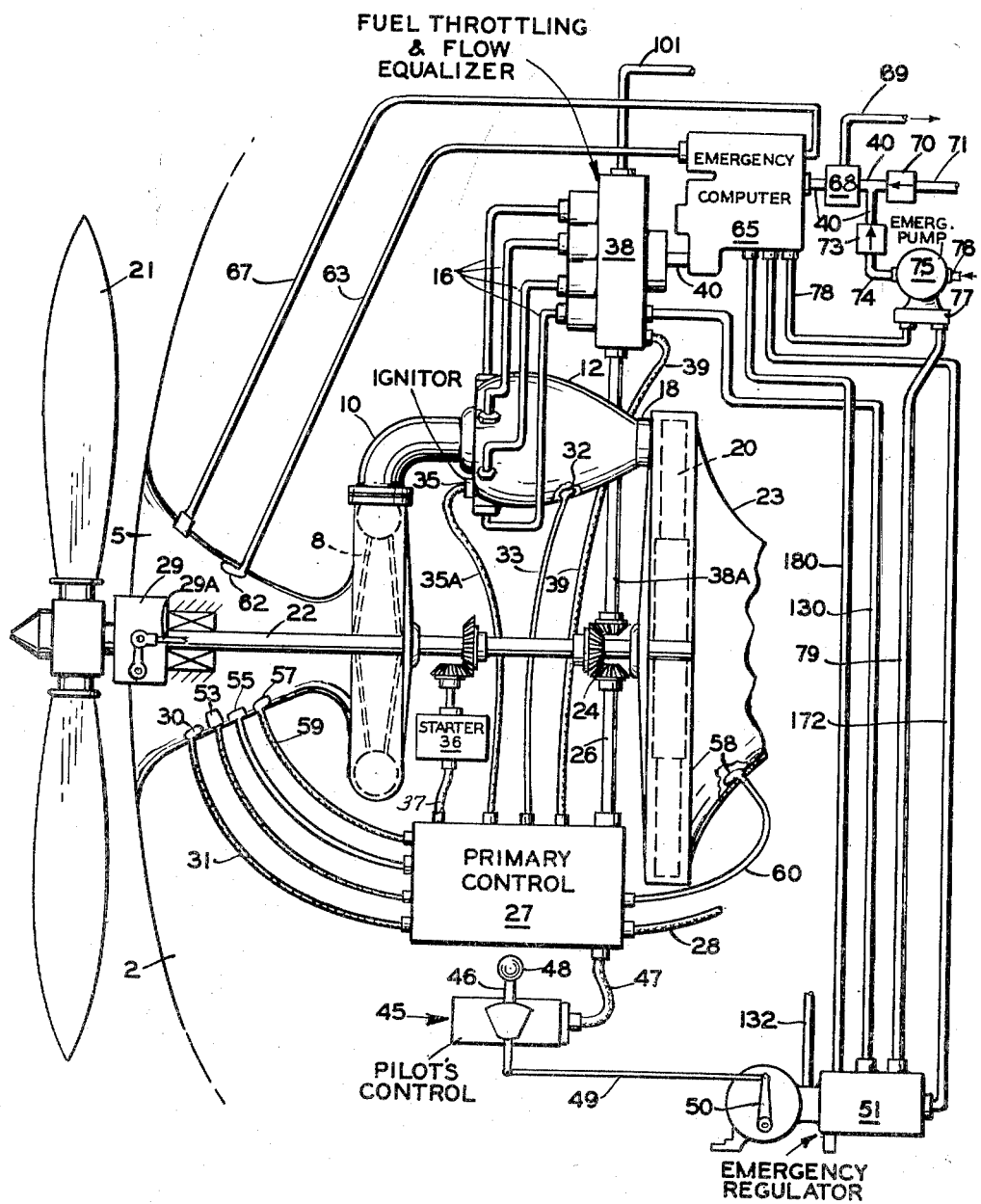
Figure 1 is a diagrammatic view of an aircraft engine or gas turbine with which the emergency control system hereinafter shown and described is designed for use.

Referring to the drawing of Figure 1, there is indicated by the numeral 2 an aircraft of the type with which the subject invention is designed for use. The aircraft in flight moves toward the left as viewed in Figure 1 so that air is rammed into an intake 5. The ram air is in turn compressed by a blower or compressor 8 and flows through a conduit 10 into a combustion chamber 12. Fuel at a controlled rate is fed through lines 16 into the combustion chamber 12.

The products of combustion flow out through a nozzle 18 to drive a turbine 20 which drives the compressor 8 and a propeller 21 through a shaft 22. The exhaust exits through a passage 23. Gearing 24 and a shaft 26 connects the shaft 22 with a speed sensing device of the primary control system indicated generally by the numeral 27 and which control system includes an automatic starter control and fuel regulator as disclosed and claimed in copending applications Serial No. 158,273, filed April 26, 1950, by Sigmund Machlanski and in application Serial No. 185,828, filed September 20, 1950, by Sigmund Machlanski.

As explained in the aforenoted applications, the primary control system 27 is operatively connected through an electrical conduit 28 with suitable control mechanism, not shown, for varying the supply of fuel to the combustion chamber 12 in accordance with the demands of the regulator 27.

The pitch of the blades of the propeller 21 may be varied by suitable mechanism 29 under control of the pilot through rod 29A during ground operation. However, during normal flight operation the mechanism 29, as explained in the application Serial No. 185,828, serves to maintain the speed of the engine at a predetermined constant value. The mechanism 29 during flight operation varies the load on the engine by changing the pitch of the propeller in response to change of engine speed so as to maintain the engine speed at the predetermined value.

Temperature responsive device 30 sensitive to the temperature of the air at the intake 5 is operably connected through a conduit 31 to the primary control 27. A temperature sensitive device 32 mounted at a suitable point in the combustion chamber 12 for sensing the temperature of the combustion gases is operably connected through a conduit 33 to the primary control. The temperature sensitive devices 30 and 32 operate through the primary control system to regulate the fuel supply to the combustion chamber 12 so as to maintain a preselected differential between air inlet and combustion chamber temperatures.

A suitable ignitor 35 is provided for initially igniting the combustion gases in the chamber 12. The ignitor 35, which may be of a conventional type, is operably connected through a suitable electrical conduit 35A to an ignitor control of the primary control system 27, as explained in the aforenoted applications.

Also arranged for driving the turbine shaft 22 in starting is a suitable starting mechanism indicated herein generally by the numeral 36 and operably connected through an electrical conduit 37 to a starter control of the primary control system 27, as explained in the aforenoted copending applications. The starting mechanism 36 may be arranged to engage the shaft 22 in driving relation during starting and disengage the shaft 22 after starting by suitable means, well known in the art.

The fuel input lines 16 may be controlled by a suitable fuel equalizer valve 38 of a type disclosed and claimed in copending application Serial No. 158,274 filed April 26, 1950, by Sigmund Machlanski and subject to maximum speed limiting means operatively connected to the shaft 22 through a shaft 38A, as explained in the latter application.

The fuel equalizer valve 38 may be controlled by the automatic starter control of the primary control system through an electrical conduit 39 operatively connected to the control 27 and the equalizer valve 38 may be supplied with fuel through a fuel conduit 40 regulated by the primary control system, as explained in the aforenoted applications, and by the emergency control system as hereinafter explained.

Figure 3:
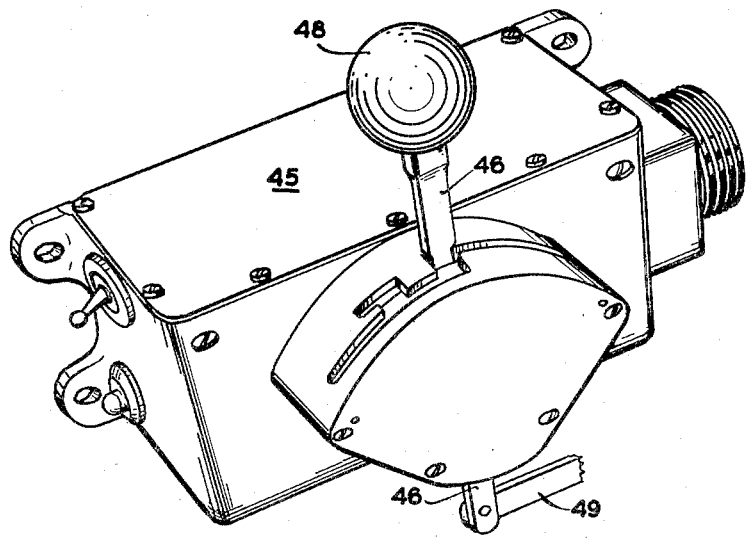
Figure 3 is a perspective view of the pilot's control mechanism for the primary and emergency control systems.

A manually operable control, indicated in Figures 1 and 3 by the numeral 45, has a control lever 46 which may be adjusted by the pilot in flight to vary the setting of the primary control system 27 to select the regulated combustion chamber temperature, as explained in the copending application Serial No. 185,828. The control 45 may be of the type disclosed and claimed in the latter application and is operatively connected to the primary control system through an electrical conduit 47. One end of the control lever 46 has a ball 48 affixed thereto for convenient manual operation of the lever 46, while the opposite end of the lever 46 projects from the casing of the control 45 and is connected through a mechanical linkage 49 to a control arm 50 of a regulator 51 of the emergency control system so as to vary the setting of regulator 51 with change of position of the control lever 46.

In normal flight operation, the maximum position of the control lever 46 and thus the maximum power selection is limited by a stop computer mechanism of the primary control system 27 which includes means for sensing air inlet temperature through a device 53, ram air inlet pressure through conduit 55, and a difference between the temperatures at the compressor inlet and at the tailpipe or exhaust 23 through thermocouples 57 and 58 operatively connected to the stop computer mechanism through conduits 59 and 60, respectively, as explained in the copending application Serial No. 185,828.

A temperature sensitive device 62 sensitive to the temperature of the air of the intake 5 is operably connected through a conduit 63 to a computer mechanism 65 of the emergency control system for purposes hereinafter explained, while a conduit 67 connects the ram air inlet pressure at intake 5 to a device sensitive thereto and mounted within the computer mechanism 65, as explained hereinafter.

The computer mechanism 65 is operably connected in the fuel supply line 40 leading from a source of fuel pressure to the equalizer valve 38. A fuel relief valve 68 is connected in the line 40 before the computer mechanism 65 so as to by-pass to drain through a conduit 69 excessive fuel in the event the fuel pressure exceeds a predetermined pressure. Leading to the line 40 through a check valve 70 is a fuel supply line 71 in which the fuel supply is regulated by the primary control 27 through suitable fuel regulating mechanism as disclosed and claimed in the copending application Serial No. 185,828. Also leading to the line 40 through a second check valve 73 is a second fuel supply output line 74 from an emergency fuel pump 75. The pump 75 has a fuel input line 76 leading from a suitable source of fuel.

The fuel pump 75 may be of a variable displacement piston type, well known in the art, in which the output flow in line 74 may be changed from zero to maximum flow by means of a hydraulic actuator 77, shown in Figure 5, which positions an eccentric cam or swash plate to vary the displacement of the pump pistons and the fuel output. The servo pressure to operate the hydraulic actuation 77 is applied through lines 78 and 79 and controlled through the emergency regulator 51 as hereinafter explained.

*Fuel throttling and flow equalizer valve mechanism*

The fuel input lines 16 to the combustion chamber 12 may be controlled by the fuel throttling and flow equalizer valve 38 of a type disclosed and claimed in copending application Serial No. 158,274, filed April 26, 1950, by Sigmund Machlanski and having maximum speed limiting means operatively connected to the shaft 22 through a shaft 38A, as explained in the latter application.

The fuel equalizer valve 38 may be placed in or out of operation by the primary electrical control 27 through an electrical conduit 39 operatively connected to the primary control. The equalizer valve 38 may be supplied through conduit 40 with fuel under control of the primary control as disclosed and claimed in copending applications Serial No. 158,273 and Serial No. 185,828.

Referring to the drawings of Figure 4 there is shown schematically the fuel equalizer valve mechanism 38 which forms the subject matter of the application Serial No. 158,274 and which mechanism includes a piston 82 carrying a plurality of wedge-shaped slots 83 of equal size in the periphery of a piston land 85.

A chamber 87 enclosed by piston lands 85 and 89 within a cylinder 91 is ported to a passage 93 leading from the fuel conduit 40 for supplying fuel to the fuel nozzles of the turbine engine through ports 94.

The wedge-shaped slots 83, referred to, open into the chamber 87. During normal operation at low fuel flow (for example up to 1500 P. P. H.) the regulating piston 82 is positioned so that the individual wedge-shaped slots 83 intercept corresponding output ports two of which are indicated here by the numerals 94 leading through passage 95 and conduit 16 to associated fuel nozzles. Close regulation is effected by the individual slots 83 being carefully hand stoned to achieve a flow distribution to the several fuel nozzles within one per cent of uniformity.

For all flow rates higher than a specified value of, for example, 1500 P. P. H., the regulating piston 82 is positioned to the extreme right as limited by a stop 96 so that the several outlet ports 94 are connected directly through the enclosed piston chamber 87 to the fuel inlet 93. In this region uniform fuel distribution is assured by the geometrical similarity of the several nozzle ports which act as fixed orifices.

At low flow the pressure drop across the nozzles is very low so in order to maintain an equal flow of fuel under low flow conditions to all nozzles the subject regulating means is provided. If such means is not provided, unequal line pressure losses or the mere position of the nozzles relative one to the other may cause unequal flows.

Use of the flow equalizer as a throttling device utilizes a hydraulic actuating system which consists of a servo piston pin 97 arranged to bias the regulator piston 82 against the force of a compression spring 99 and in which the opposite ends of the piston 82 are balanced by a connection to drain through a passage 101.

A servo pressure chamber 103 is fed from the fuel inlet 93 of the flow equalizer (corresponding to fuel line 40) through restriction 105. During normal operation, the pressure in the servo chamber 103 is the same as that of the fuel pressure applied to passage 93 and the regulating piston 82 is moved by the piston 97 into the operating region. For emergency overspeed throttling, however, a valve 107 controlling passage 108 may open the passage 108 so as to vent the chamber 103 to the drain passage 101.

The valve 107 is arranged for actuation by a suitable speed responsive mechanism 109 driven by shaft 38A from the engine so as to decrease the servo pressure in the chamber 103 and permit the fuel regulating piston 82 to accordingly move toward a fuel throttling position under force of the spring 99 to regulate the fuel supply to the engine to prevent the engine operating at speeds in excess of a predetermined safe value.

For shutting down the engine there is provided a valve 111 having land portions 113 and 115 defining a chamber 116. The valve 111 is operated by a solenoid 117 controlled by a circuit 119 including a battery or source of electrical energy 121 and a switch 123 which may be operated by the pilot through the primary control 27 as explained in the copending application Serial No. 185,828.

In normal operation the valve 111 is in the position shown in the drawing in which land portion 113 closes drain passage 101 from opening into chamber 116 and the bleed passage 105 leads from the passage 93 through chamber 116 and a passage 125 to chamber 103.

To shut down the engine, the switch 123 may be closed by the pilot to effect energization of the solenoid 117 so as to bias the valve 111 upward against the force of a spring 127, to the position indicated in dotted lines, in which position the land 113 opens servo pressure chamber 103 through passage 125 and chamber 116 to the drain line 101 and the land 115, as further indicated in dotted lines, closes the chamber 116 to the restricted passage 105. The opening of the servo chamber 103 to drain causes the regulating piston 82 to be biased under force of the spring 99 toward the left to cut off the fuel supply. Further, the energization of the solenoid 117 actuates the valve 111 so as to remove a stop portion 129 from the path of the regulator piston 82 so as to permit the piston 82 to move under force of the spring 99 to the end of the cylinder 91, as indicated in dotted lines so as to connect the nozzle lines 16 and the drain line 101 through the cylinder 91. Under these circumstances the nozzle lines 16 are then blown clear of fuel by the back pressure existing in the combustion chamber of the engine. This prevents fuel dripping and burning at the nozzles after the system has been shut down.

The solenoid 117 is arranged so that when deenergized, the solenoid slide valve 111 is positioned by the spring 127 in an operating position in which the inlet pressure supply 93 is connected through the restriction 105 to the servo chamber 103 and the drain connection to the servo chamber 103 is blocked off by the land portion 113. In the latter position of valve 111 servo pressure is applied to the piston pin 97 causing movement of the regulating valve 82 toward the right releasing the stop portion 129 under force of the spring 127 into the position shown in the drawing.

Of course, when the solenoid is energized, the slide valve 111 reverses these connections so that the inlet pressure supply is blocked off by land 115 from the servo chamber 103 while the connection 101 is opened to the chamber 103 through chamber 116. The foregoing structure of the equalizing valve 38 is disclosed and claimed in the copending applacation Serial No. 158,274, filed April 26, 1950, by Sigmund Machlanski.

However, upon the emergency control system being brought into operation, the valve mechanism 38 may be further regulated to effect a throttling action of the fuel supplied to the combustion chamber 12. A conduit 130 leading from the passage 108 is connected, as shown in Figure 1 to an emergency regulator 51 and to a pilot valve mechanism provided therein, as shown in Figures 5, 6 and 7. As explained with reference ot the emergency regulator 51, the conduit 130 may be opened by the pilot valve mechanism provided therein to a drain conduit 132 so as to decrease the servo pressure in the chamber 103 to effect a fuel throttling action by the piston 82 upon an excessive fuel flow in the conduit 40 and thereby throttle the fuel flow to the scheduled value.

*Emergency regulator*

The emergency regulator mechanism 51, one form of which is shown diagrammatically in Figure 5, includes the adjustable arm 50 operatively connected through the link 49 to the pilot's control lever 46. The adjustable arm 50 is operatively connected through gearing 136 with a cam 138 so as to adjust the setting of a cross type servo valve mechanism 140 pivotally mounted on a pin 141.

An arm 142 of the valve mechanism 140 is operatively positioned between spring biasing elements 144 and 146. The biasing force of the spring element 144 is varied by adjustment of the cam 138. Arms 148 and 150 of the mechanism 140 have spring biased flap valve elements 149 and 151 shown in dotted lines to control bleed orifices 152 and 154.

Thus, the arms 148 and 150 of the mechanism 140 control, respectively, the opening to the drain conduit 132 of the bleed orifice 152 of the line 130 and the opening of the bleed orifice 154 of the line 79. Line 130 controls the operation of the equalizer valve 38, as heretofore explained, while the bleed orifice 154 of the line 79 controls the operation of the hydraulic actuator mechanism 77 controlling the emergency pump 75, as shown in Figures 1 and 5 and hereinafter explained.

The remaining arm 161 of the mechanism 140 engages one end of a pin 162. The opposite end of the pin 162 is fixedly mounted on a movable plate 163 of a differential bellows mechanism 164. The differential bellows mechanism 164 includes an expansible bellows 170 operatively connected through a conduit 172 to the conduit 40 at the upstream side of a restricted orifice 174 provided in the fuel conduit 40, as explained hereinafter. There is further provided in the differential bellows mechanism 164 a second expansible bellows 178 operatively connected through a conduit 180 to the downstream side of the restricted orifice 174. Opposite ends 182 and 184 of the bellows assembly 164 are fixedly mounted, while the movable plate 163 mounted between the bellows 170 and 178 may be adjustably positioned upon changes in differential pressure across the restricted orifice 174. Such movement of the plate 163 will cause a corresponding adjustment of the pin 162 to adjust the valve mechanism 140 relative to the bleed orifices 152 and 154.

Thus, upon the differential pressure increasing above the selected value the pin 162 will tend to move downwardly and the servo valve 140 will be adjusted in a clockwise direction about the pin 141 by spring 146 so as to tend to cause flapper 149 to open the bleed orifice 152, while the flapper 151 tends to hold closed the bleed orifice 154. Upon the differential pressure decreasing below the selected value the pin 162 will tend to move upwardly against the force of spring 146 and the servo valve 140 will be actuated in an opposite counterclockwise direction so as to tend to cause the flapper 151 to open the bleed valve 154 while the flapper 149 tends to hold closed the bleed valve 152.

The spring biased flappers 149 and 151 are so arranged as to maintain the bleed orifices 152 and 154 closed during normal scheduled fuel flow conditions and serve to open one or the other of said bleed orifices only at such times as the fuel flow under control of the primary control 27 may exceed or drop below a predetermined dead band relative to the scheduled value, as upon failure of the primary electrical control system 27.

The flappers 149 and 151 in maintaining the bleed orifices 152 and 154 closed within such dead band serve to permit transient fluctuations in the fuel flow within such band, which transient fluctuations may be corrected by the primary control system 27 without need of the emergency control system.

Acting in opposition to the spring 146 is the spring 144 the biasing force of which is adjusted by the cam 138 to vary the setting of the differential bellows 164 in accordance with a predetermined schedule and the position of control lever 46.

The regulator mechanism 51 thus senses the position of the control handle 46 and matches its scheduled value provided by the contour of cam 138 against the fuel flow in conduit 40 as measured by the pressure differential across the restricted orifice 174 in conduit 40. Under conditions indicating that the primary control system is not regulating the fuel in line 40 to the scheduled value determined by the position of the control handle 46, and the diameter of the variable orifice 174 is determined by the ratio of $P/T$, the differential bellows mechanism 164 operates the servo valve 140 controlling the servo bleeds 152 and 154 to correct such condition.

Thus, under a condition of excessive fuel flow the differential bellows mechanism 164 causes flapper 149 of servo valve 140 to open bleed 152 causing the valve mechanism 38 to throttle the fuel supplied through line 40 to the desired value, while flap valve 151 holds closed the bleed 154 to cause hydraulic actuator 77 to maintain a zero pump output position.

The latter control, as shown in Figure 5, includes a piston 190 slidably mounted in a chamber 192. Opening into the chamber 192 at one side of the piston 190 is the conduit 78 leading from the conduit 40 at the upstream side, as shown in Figure 5. Opening into the chamber 192 at the opposite side of the piston 190 is the conduit 79. Conduits 77 and 79 are connected through a restricted orifice 194. An actuator rod 196 for controlling the fuel output of the pump is connected to the piston 190 so that the effective area of the piston 190 at the side 198 is less than the effective area of the piston 190 at opposite side 200.

It will be seen then that the closing of bleed orifice 154 will increase the pressure applied at the side 200 of greater effective area so as to cause a downward adjustment of the actuator rod 196 to maintain a zero fuel output from the emergency pump 75 under normal or excessive fuel flow conditions.

Under excessive fuel flow conditions, the opening of bleed orifice 152 serves to effect a throttling action on the fuel flow by the valve mechanism 38, while under conditions of normal scheduled flow of fuel to the engine through the conduit 40, the servo valve 140 causes flappers 149 and 151 to maintain both bleed orifices 152 and 154 closed so that the emergency pump control is positioned at the extreme downward zero fuel output position and the valve mechanism 38 is not affected by the emergency regulator 51.

Now in the event the fuel flow through the conduit 40 be less than the scheduled amount, then the differential bellows mechanism 164 causes flap valve 151 of the servo valve 140 to open bleed 154, while the flapper 149 continues to hold closed the bleed 152. The opening of bleed valve 154 decreases the servo pressure applied to the side 200 relative to the pressure applied to the side 198 of the piston 190 so that movement of the piston 190 under the force applied at side 198 may be effected in a direction for increasing the fuel output of the pump 72 until the deficiency in fuel flow is met.

A restriction 201 is provided in the line 79 leading into the chamber 192 so as to dampen the response of the piston 190 to changes in the servo valve 140 and thereby effect greater stability of control.

*Computer mechanism*

The computer mechanism 65 senses the inlet air temperature through the temperature pick-up bulb 62 which is connected through a capillary tubing 63 to a bellows assembly 205, as shown in Figures 1 and 5. The pick-up bulb 62, bellows assembly 205 and capillary tubing 63 have sealed therein a suitable temperature responsive liquid, well known in the art, which expands with increase in temperature so as to affect the bellows 205 in response to the air inlet temperature. The computer mechanism 65 senses ram air inlet pressure through a tubing 67 which leads into the interior of the pressure responsive bellows 207 as shown in Fig. 5.

Computer mechanism 65 is further arranged to vary the area of the restricted orifice 174 in the fuel conduit 40 with changes in $P/T$ or the computed relation of the air inlet pressure to the inlet temperature. A portion of the fuel conduit 40 extends through the mechanism 65, as shown in Fig. 5. The restricted orifice 174 in the conduit 40 consists of a bell-mouthed orifice with a mandrel plug 209 extending into its center. The mandrel plug 209 may be adjustably positioned by a hydraulic servo mechanism 211 of conventional type through a rod 212. The hydraulic servo mechanism 211 may be controlled by a hydraulic servo valve of conventional type and having a stem 214 which is operative to effect positional control of the plug 209.

Each position of the valve stem 214 effects through the hydraulic servo mechanism 211 a corresponding position of the mandrel 209 resulting in a particular orifice throat area which represents the particular value of $P/T$. The pressure drop across the orifice 174 of $\Delta P$ must be large enough to overcome and minimize the affect of friction and bellows hysteresis on the valve mechanism 140 of the regulator 51 and at the same time not have such a large range as to require the balancing regulator spring load (springs 144 and 146) to become excessive.

Figure 2:
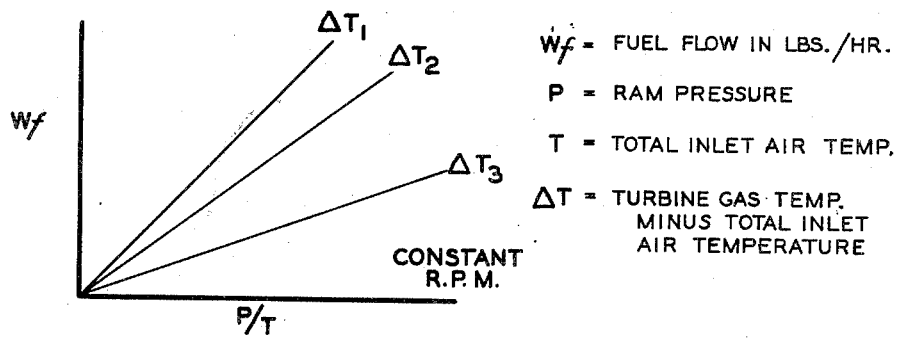
Figure 2 is a graphical illustration of the theoretical basis for operation of the emergency control system.

Since, as shown graphically in Figure 2, the control is based on a schedule of fuel flow vs. the air density factor $P/T$, there is provided means to determine the relationship between the air intake pressure and temperature and for computing the factor $P/T$. The value of $P/T$ is computed by means of a three dimensional cam 216 having a calculated surface contour cooperating with a cam follower 217 so as to give the calculated value of $P/T$ for the prevailing air intake temperature and pressure conditions which conditions position the cam 216 relative to the cam follower 217. The cam follower 217 is slidably mounted in a bearing 217A and is connected through a lever 218 to the valve stem 214 of the positional control servo mechanism 211. A light spring 218A biases the cam follower 217 into contacting relation with the surface of cam 216. The lever 218 is pivotally mounted on a pin 218B.

Longitudinal movement is imparted to the cam 216 by the air inlet temperature responsive bellows 205 which is operatively connected to the cam 216 through a rod 219 and a cam adjusting rod 220. The rod 220 is operably connected to the rod 219 through a coupling 222 which may be of conventional type and permits rotative movement of the rod 220 relative to the rod 219. Rotative movement is imparted to the cam 216 by the ram air inlet pressure responsive bellows 207 through the rod 220. The bellows 207 is operatively connected to the rod 220 through a linkage 224, pinion gear 226 and sector gear 228. The teeth of the pinion gear 226 and sector gear 228 are arranged so as to permit longitudinal movement of the rod 220 and sector gear 228 relative to the pinion gear 226 upon expansion or contraction of the bellows 205. The pinion gear 226 and sector gear 228 in turn impart rotative movement to the shaft 220 and cam 216 in response to expansion and contraction of the bellows 207.

It will be seen then that the value of pressure/temperature is computed mechanically by means of the bellows 207 and 205 and the cam 216; and that each value of pressure/temperature acts through the cam follower 217 and servo mechanism 211 to fix the size of the variable restricted orifice 174 whose pressure differential is tapped off through conduits 172 and 180 and brought out to the differential bellows 164 of the regulator mechanism 51, as shown in Figure 5.

Thus, through the computer mechanism 65 the throat area of the restricted orifice 174 may be varied with changes in the value $P/T$ so as to vary the datum of the regulator mechanism 51 in accordance therewith and thus compensate the mechanism 51 for change in the value of $P/T$ so as to maintain a scheduled fuel flow to the engine through the conduit 40 for effecting a selected engine power output as determined by the position of the hand lever 46 under the prevailing ram air inlet pressure and air inlet temperature conditions of the engine.

*Second form of emergency regulator mechanism*

A second form of the Emergency Fuel Regulator Mechanism 51 is shown in Figures 6 and 7 in which there is provided a casing including portions 235, 236 and 237. These casing portions are affixed together by sealing members 239 and 241. A plate 243 is affixed to the portion 235 by suitable bolts 245 and the plate 243 has rotatably mounted thereon the setting adjustment arm 50, which, as shown in Figure 1, is connected through linkage 49 to the pilot's control lever 46.

The adjustment arm 50 is connected through a sector gear 247 to a pinion gear 249 for adjustably positioning a cam 251, as indicated by dotted lines in Figure 6.

The cam 251 is adjustably positioned in the casing portion 235. Bearing upon the cam 251 is one end of a rod 253 slidably mounted in a valve sleeve 254 press-fitted in the casing portion 235.

The opposite end of the rod 253 bears upon a cup shaped member 255 slidably mounted in the casing portion 235 and supporting one end of a spring 257. The opposite end of the spring 257 is supported in the casing portion 236 by a second cup shaped member 259 which bears upon one end of a valve 261 slidably mounted in a valve sleeve 263 press-fitted in the casing portion 236. The valve 261 is operatively engaged at its opposite end by a bellows mechanism 265 mounted in the casing portion 236 and held in position by the casing end portion 237 affixed to the casing portion 236 by bolts 266. The bellows 265 is subject to the upstream fuel pressure in the fuel conduit 40 which is applied to the interior of bellows 265 through the conduit 172 connected through casing portion 237. The exterior surface of the bellows 265 is subject to the downstream pressure applied through conduit 180. The conduit 180 opens into a chamber 267 defined by the members 255 and 259. Ports 269 and 271 apply the pressure at opposite ends of the members 255 and 259 in counterbalancing relation, while a passage 273 along the valve sleeve 263 connects the downstream pressure to chamber 275 formed in the casing portion 236 and in which chamber the bellows 265 is positioned.

The bellows 265 thus senses the differential pressure across the variable orifice 174 and causes adjustment of the valve 261 to maintain the selected pressure differential. The valve 261 includes land portions 277, 278 and 279 and opening into a chamber between lands 277 and 278 is a port 280 leading from conduit 130 and opening into a chamber between lands 277 and 279 is a port 281. The lands 278 and 279 control the opening of bleed ports 282 and 283 from the ports 280 and 281, respectively. The bleed ports 282 and 283 open as shown in dotted lines in Figure 6 to a drain conduit 284.

The drain conduit 284, as shown in Figure 7, extends from casing portion 236 to portion 235 and opens through a valve passage 286 to the drain conduit 132. The passages 286 may be closed by a land portion 288 provided on the rod 253 and arranged so as to close the drain passages 286 opening into drain conduit 132 upon movement of rod 253 through adjustment of the control arm 50 to some preselected position, as just below the engine idling position. The arm 50 as shown in Fig. 1 is connected through a link 49 with the pilot's main control lever 46.

However, upon the valve 288 being adjusted to an open position, it will readily be seen that the opening of bleed port 282 by adjustment of land 278 will open line 130 to the drain conduit 132 so as to in turn cause a throttling action of the valve mechanism 38 to decrease the fuel supply as upon the fuel supplied to the engine by the primary control exceeding the scheduled amount, as heretofore explained with reference to Figure 5. Similarly, an opening of the bleed orifice 283 by adjustment of land 279 will effect the opening of line 79 to the drain conduit 132 so as to in turn cause the emergency pump 75 to supply fuel to the engine in increasing amounts upon the primary control being below the scheduled, as heretofore explained with reference to Figure 5.

The valve lands 278 and 279 are so arranged relative to the bleed orifices 282 and 283 as to maintain the bleed orifices closed during normal scheduled fuel flow conditions and serve to open one or the other of said bleed orifices only at such times as the fuel flow under control of the primary control 27 may exceed or drop below a predetermined dead band relative to the scheduled value, as upon failure of the primary electrical control system 27.

The valve lands 278 and 279 in maintaining the bleed orifices 282 and 283 closed within such dead band serve to permit transient fluctuations in the fuel flow within such band, which transient fluctuations may be corrected by primary control system 27 without need of the emergency control system.

*Second form of computer mechanism*

A second form of the computer mechanism 65 is shown in Figure 8 in which like numerals indicate corresponding parts to those previously explained with reference to the computer mechanism 65 of Figure 5 and the operation of which parts it is believed will be readily understood in view of the explanation of the computer mechanism of Figure 5.

The form of the computer mechanism 65 shown in Figure 8 includes a servo pressure regulating valve mechanism 300 including a fixed valve sleeve 302 having a groove portion 304 connected through a passage 306 to the upstream fuel pressure in conduit 40. The passage 306 is also connected through the groove portion 304 to the conduit 172 leading to the regulator 51, as indicated in Figure 1.

Slidably mounted in the valve sleeve 302 is a valve member 308 having land portions 309 and 310. The land portion 309 controls a port 311 opening from the groove 304 into a chamber 305 in the valve sleeve 302 between the land portions 309 and 310. A spring 312 biases one end of valve member 308 in a direction tending to cause land portions 309 to open the port 311 to chamber 305 while the regulated servo pressure in chamber 305 is applied to the opposite end of the valve member 308 through ports 314 in the land 309 and biases the valve member 308 in an opposite direction tending to cause land portion 309 to close the port 311 to chamber 305.

It will be seen then that the regulated pressure in the chamber 305 between the land portions 309 and 310 will be maintained at a predetermined constant value dependent upon the pressure setting of the spring 312. The latter regulated pressure in chamber 305 is then applied through a port 316 to a groove 318 in the valve sleeve 302.

The groove 318 is connected to a passage 320 leading to the servo mechanism 211. The passage 320 has a restriction 322 therein and opens through a passage 324 to a chamber 326 at one end of a servo piston 328 provided in the servo mechanism 211. The servo piston 328 is slidably mounted in a fixed sleeve 330 provided in the servo mechanism 211 and is operably connected through the rod 212 to the plug 209 so as to control the position thereof relative to the bell mouthed restricted orifice 174.

A passage 331 leads from the chamber 326 to a chamber 333 provided in the piston 328. A second passage 335 leads from the chamber 333 to a chamber 337 at the opposite end of the piston 328 from the chamber 326. The chamber 337 opens to the interior of the casing of the computer mechanism 65 or drain pressure through a passage 339. A valve member 341 operatively connected to the valve stem 214 controls the opening of passage 335 to chamber 333 and thus controls the bleed from chamber 326 to drain. The valve 341 is biased by a light spring 343 in a direction opening the passage 335 to chamber 333. The spring 343 further serves to bias the cam follower 217 into contacting relation with the surface of cam 216.

It will be seen then that upon valve member 341 being in a position, as shown in Figure 8, to open the passage 335, the pressure in chamber 326 will bleed to the lower pressure in chamber 337, whereupon the biasing force of the upstream fuel pressure applied to the end of stem 345 of the plug 209 will cause the piston 328 to be biased toward the left as viewed in Figure 8. However, upon the valve member 341 being adjusted through action of P/T computer cam 216 and follower 219 so as to close the passage 335 to the chamber 333, the pressure in chamber 326 will then increase and since the effective surface area of the piston 328 upon which the pressure chamber 326 is applied is somewhat greater than the effective surface area of the stem 345 subject to the upstream fuel pressure, the piston 328 will be moved to the right. Such movement of the piston 328 relative to the valve 341 will in turn open the passage 335 to cause the piston 328 to assume a second balanced position depending upon the adjusted position of the cam follower 217 by the P/T cam 216. The piston 328 will cause the plug 209 to take a corresponding second position which is likewise dependent upon the adjusted position of the cam follower 217 by the cam 216.

The cam 216 is longitudinally adjustable relative to the cam follower 217 by the temperature responsive mechanism 205 acting through a lever arm 347 pivotally mounted at 346 and connected through a pin 348 to a member 349 affixed in a sleeve member 350. The cam 216 is affixed to the lower end of the sleeve 350. The pin 348 projects into a groove 351 in the upper end of the member 349 so as to transmit from the lever 347 longitudinal motion to the sleeve 350 and cam 216 while permitting rotary movement to be imparted to member 349 and sleeve 350 relative to the pin 348 and lever arm 347.

The lower end of the sleeve 350 is freely rotatable on a pin 351 which projects into the sleeve 350. The pin 351 is rotatably mounted at its lower end in an anti-friction roller bearing assembly 352. Suitable gear teeth 353 are provided in the sleeve 350 and a bearing race member 354 of an anti-friction roller bearing assembly freely supports the toothed surface of the sleeve 350 in rotatable relation thereto. The teeth 353 are arranged to operatively engage cooperating teeth of a sector gear 355 for rotary movement thereby, while permitting longitudinal movement of the sleeve 350 relative to the sector gear 355 and into the bearing race member 354. The sector gear 355 is operatively connected through a linkage 356 to the ram air inlet pressure responsive bellows 207 to transmit rotary movement to the cam 216 in response thereto.

As shown in Figure 8, a second evacuated bellows 357 acts in opposition to the bellows 207. The bellows 207 and 357 have equal effective surface areas. Thus, pressure medium acting on the exterior surface of the bellows 207 will be balanced by a like pressure medium applied to the exterior surface of the bellows 357. Connected to the bellows 207 and 357 and in operative relation thereby is an arm 358 pivotally mounted at 259 and arranged to position the linkage 256 in accordance with the ram air inlet pressure applied to the interior of the bellows 207 through conduit 67.

A drain passage 360 indicated by dotted lines in Figure 8 leads from the interior of the housing of the mechanism 65 to the drain conduit 132. There is also connected to the drain passage 360, a second passage 361 leading from a chamber 363 at the spring end of the regulating valve 308 so as to subject the latter end of the regulating valve 308 to drain pressure. A bleed port 365 connects the regulated pressure in the chamber 305 to the drain pressure in chamber 363 so as to provide a pressure bleed under extreme regulator pressure conditions to prevent entrapment of the pressure fluid in chamber 305 upon the land 309 fully closing port 311.

A further passage 366 indicated by dotted lines in Figure 8, connects the downstream pressure at the throat of the bell-mouthed orifice 174 with the conduit 180.

The operation of the computer mechanism 65 of Figure 8 follows essentially the operation of the computer mechanism of Figure 5 as heretofore explained, and it is believed that no further detailed description thereof is necessary.

Although several embodiments of the invention have been illustrated and described, various changes in the form and relative arrangements of the parts may be made to suit requirements.

What is claimed is:

1. A fuel regulator for an aircraft engine; comprising, in combination, a differential bellows responsive to fuel flow, a first valve longitudinally movable in one sense to increase the fuel flow and longitudinally movable in an opposite sense to decrease the fuel flow, a manually adjustable cam, a second longitudinally movable valve to control said first valve, said second valve operatively connected at one end to said cam, a spring operatively connected between the other end of said second valve and one end of said first valve, and the other end of said first valve being operatively connected to said differential bellows, said second valve being in longitudinal alignment with said spring, first mentioned valve and differential bellows and adjustably positioned by said cam to vary the datum of said differential bellows and effective at a predetermined adjusted position of said cam to place said second valve in an inoperative relation.

2. A fuel regulating system for a constant speed aircraft engine, comprising, in combination, a primary control system for normally regulating the flow of fuel to said engine, an emergency control system for regulating the flow of fuel to said engine upon failure of the primary control system, said emergency control system including means responsive to the flow of fuel to said engine for initiating operation of said emergency control system to maintain a scheduled fuel flow condition, datum changing means for varying the scheduled fuel flow condition of said emergency control system, air inlet temperature responsive means, air inlet pressure responsive means, and cam means operatively connecting said air inlet pressure and temperature responsive means jointly to said datum changing means to effect a predetermined power output from said engine under varying air inlet pressure and temperature conditions.

3. A fuel regulating system for a constant speed aircraft engine, comprising, in combination, a primary control system for normally regulating the flow of fuel to said engine through a supply conduit, an emergency control system for regulating the flow of fuel to said engine through said conduit upon failure of the primary control system, said emergency control system including a restricted orifice in said supply conduit having a liquid fuel inlet and outlet, an emergency pump for supplying liquid fuel to said inlet and valve means for throttling the liquid fuel from said outlet, first control means for the emergency pump, second control means for the throttling valve, means responsive to the pressure drop in the fuel flowing through said restricted orifice, means operatively connecting said pressure responsive means to said first and second control means, said first control means affecting the emergency pump to increase the flow of liquid fuel to said inlet upon a decrease in the pressure drop across said orifice below a preselected normal value, and said second control means affecting the throttling valve to decrease the flow of liquid fuel from said outlet in response to an increase in the pressure drop across said orifice above a preselected normal value.

4. The combination defined by claim 3 including a movable member for varying the effective area of said orifice, motor means for positioning said movable member, and atmospheric condition responsive means for controlling said motor means so as to effect a predetermined power output from said engine under the prevailing atmospheric conditions.

5. In an aircraft engine fuel regulating means of the type including a hollow body part having an inlet and an outlet for liquid fuel under pressure, a variable choke arranged between the inlet and outlet to effect a pressure difference between the liquid at the inlet and outlet, liquid pressure responsive means arranged to be exposed at one side to the liquid pressure at the outlet, and at the other side to the liquid pressure at the inlet, fuel control means arranged in series with the choke to vary the pressure difference created by the choke, and means for varying the operation of the control means under the control of the liquid pressure responsive means; the improvement comprising atmospheric temperature responsive means, atmospheric pressure responsive means, a cam operably positioned in one sense by said temperature responsive means and operably positioned in another sense by said pressure responsive means, a cam follower cooperating with the cam, and servo motor means for varying the choke under control of the cam follower.

6. In an aircraft engine fuel regulating means of the type including a hollow body part having an inlet and an outlet for liquid fuel under pressure, a variable choke arranged between the inlet and outlet to effect a pressure difference between the liquid at the inlet and outlet, liquid pressure responsive means arranged to be exposed at one side to the liquid pressure at the outlet, and at the other side to the liquid pressure at the inlet, fuel control means arranged in series with the choke to vary the pressure difference created by the choke, and means for varying the operation of the control means under the control of the liquid pressure responsive means; the improvement comprising an engine air inlet temperature responsive device, an engine air inlet pressure responsive device, a cam and a cam follower cooperating therewith, means operably connecting one of said devices to said cam for longitudinally positioning said cam relative to said cam follower, other means operably connecting the other of said devices to said cam for rotatably positioning said cam relative to said cam follower, and servo motor means for varying the choke under the control of the cam follower.

7. A fuel regulator for a constant speed aircraft engine, comprising in combination a hollow body part having an inlet and an outlet for liquid fuel under pressure, a variable choke arranged between the inlet and outlet to effect a pressure difference between the liquid at the inlet and outlet, fuel flow responsive means arranged to be exposed at one side to the liquid pressure at the inlet and at the other side to the liquid pressure at the outlet, control means operated by the fuel flow responsive means for regulating said fuel flow to a selected value, pilot operated means for setting the fuel flow responsive means to said selected value, including means operative directly by said pilot operative means for discontinuing operation of the control means, other means for varying the setting of said fuel flow responsive means including cam means having a predetermined effective contour, a cam follower positioned by the effective contour of said cam means, atmospheric condition responsive means for operatively positioning said cam means relative to said cam follower to change the effective contour of said cam means, and means operatively connecting said cam follower to said choke for varying the position of said choke in accordance with the predetermined effective contour of said cam means upon a change in said condition.

8. A fuel regulator for a constant speed aircraft engine, comprising in combination a hollow body part having an inlet and an outlet for liquid under pressure, a variable choke arranged between the inlet and outlet, a differential membrane arranged to be exposed at one side to the liquid pressure at the inlet and at the other side to the liquid pressure at the outlet, a valve mechanism operative in one sense to affect a device to increase the fuel flow and operative in a second sense to affect another device to decrease the fuel flow, an adjustable cam, spring means applying a biasing force to said membrane, said spring means operatively connected between said cam and said valve mechanism and adjustable by said cam to change the biasing force applied by said spring means to said differential membrane, means operatively connecting said differential membrane to said valve mechanism, and other means for changing the liquid pressure applied to said differential membrane including means for varying the position of said choke.

9. The combination defined by claim 8 in which the last mentioned liquid pressure changing means includes cam means having a predetermined effective contour, a cam follower positioned by said cam means in accordance with the effective contour thereof, a temperature condition responsive means, a fluid pressure condition responsive means, means operably connecting one of said condition responsive means to said cam means for longitudinally positioning said cam means relative to said cam follower, other means operably connecting the other of said condition responsive means to said cam means for rotatably positioning said cam means relative to said cam follower, and means operatively connecting said cam follower to the choke for varying the position of the choke in accordance with the predetermined effective contour of said cam means upon a change in one of said conditions.

10. A fuel regulator for an aircraft engine; comprising, in combination, a differential membrane responsive to fuel flow, a valve mechanism operative in one sense to affect a device to increase the fuel flow and operative in a second sense to affect another device to decrease the fuel flow, an adjustable cam, spring means adjustable by said cam and operatively connected between said cam and said valve mechanism, means operatively connecting said differential membrane to said valve mechanism, a cross shaped member, a pin pivotally supporting said member in operative relation, said cross shaped member having one arm operatively connected to the spring means, another arm operatively connected to the differential bellows, and said valve mechanism including servo valve means operatively connected to the two remaining arms of said cross shaped member.

11. A fuel regulator for an aircraft engine; comprising, in combination, a differential membrane responsive to fuel flow, a valve mechanism operative in one sense to affect a device to increase the fuel flow and operative in a second sense to affect another device to decrease the fuel flow, an adjustable cam, spring means adjustable by said cam and operatively connected between said cam and said valve mechanism, means operatively connecting said differential membrane to said valve mechanism, a second valve member operatively connecting said cam and spring means and effective for placing the first mentioned valve mechanism in an inoperative relation upon a predetermined adjustment of said cam.

12. A liquid regulator system for a constant speed aircraft engine, comprising, in combination, a pair of members forming a variable orifice, a liquid fuel inlet passage leading to one side of said variable orifice, a liquid fuel outlet passage communicating with the other side of said variable orifice, pump means for increasing the supply of liquid fuel to said inlet passage, means for operating said pump means in response to a decrease in the pressure drop across said orifice below a preselected normal value, throttling valve means for decreasing the supply of liquid fuel from said outlet passage, means for operating said valve means in response to an increase in the pressure drop across said orifice above a preselected normal value, motor means for varying the effective area of said orifice by causing relative movement of said members forming said variable orifice, atmospheric condition responsive means for controlling said motor means so as to effect a predetermined power output from said engine under the prevailing atmospheric conditions, said condition responsive means including a cam follower for controlling said motor means, a variable contour cam cooperating with said cam follower, said cam adjustable longitudinally and rotatively relative to said cam follower, engine air inlet temperature responsive means for adjusting said cam in one of said senses, and engine air inlet pressure responsive means for adjusting said cam in the other of said senses.

13. The combination comprising a hollow body part having an inlet and an outlet for liquid fuel under pressure, a variable choke arranged between the inlet and outlet to effect a pressure difference between the liquid at the inlet and outlet, cam means having a predetermined effective contour, a cam follower positioned by the effective contour of said cam means, condition responsive means for operatively positioning said cam means relative to said cam follower to change the position of said cam follower, means operatively connecting said cam follower to said choke for varying the position of said choke in accordance with the effective contour of said cam means upon a change in said condition, said condition responsive means including a temperature responsive device, a fluid pressure responsive device, means operably connecting one of said devices to said cam means for longitudinally positioning said cam means relative to said cam follower, and other means operably connecting the other of said devices to said cam means for rotatably positioning said cam means relative to said cam follower.

References Cited in the file of this patent

UNITED STATES PATENTS

| | | |
|---|---|---|
| 2,422,808 | Stokes | June 24, 1947 |
| 2,440,371 | Holley | Apr. 27, 1948 |
| 2,479,813 | Chamberlin et al. | Aug. 23, 1949 |
| 2,498,939 | Bobier | Feb. 28, 1950 |
| 2,508,260 | Holley | May 16, 1950 |
| 2,673,556 | Reggio | Mar. 30, 1954 |

FOREIGN PATENTS

| | | |
|---|---|---|
| 941,556 | France | July 19, 1948 |